E. J. BOYLER & P. R. & H. M. GREIST.
BUTTONHOLE ATTACHMENT FOR SEWING MACHINES.
APPLICATION FILED AUG. 21, 1911.
1,035,942.
Patented Aug. 20, 1912.
6 SHEETS—SHEET 1.
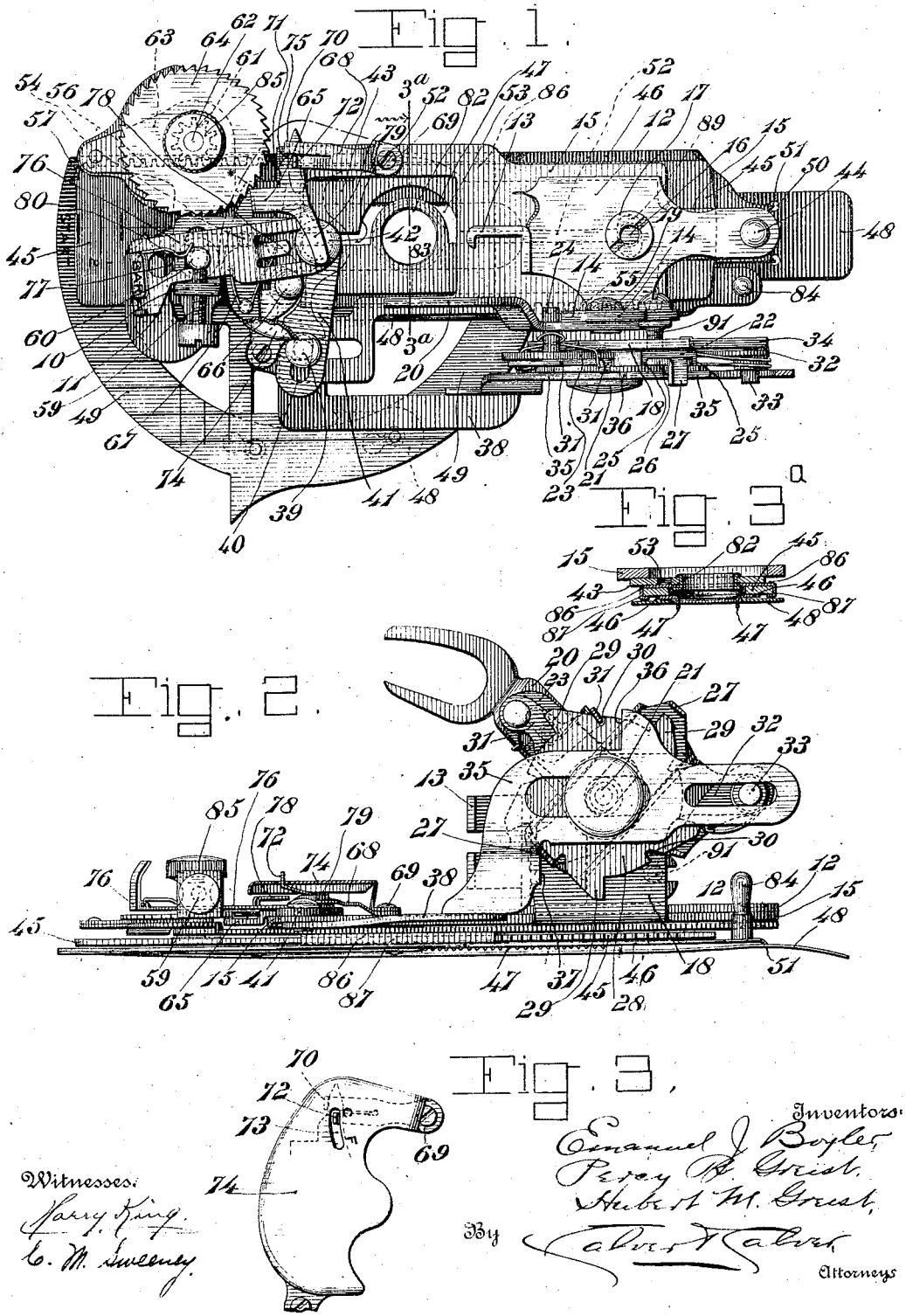

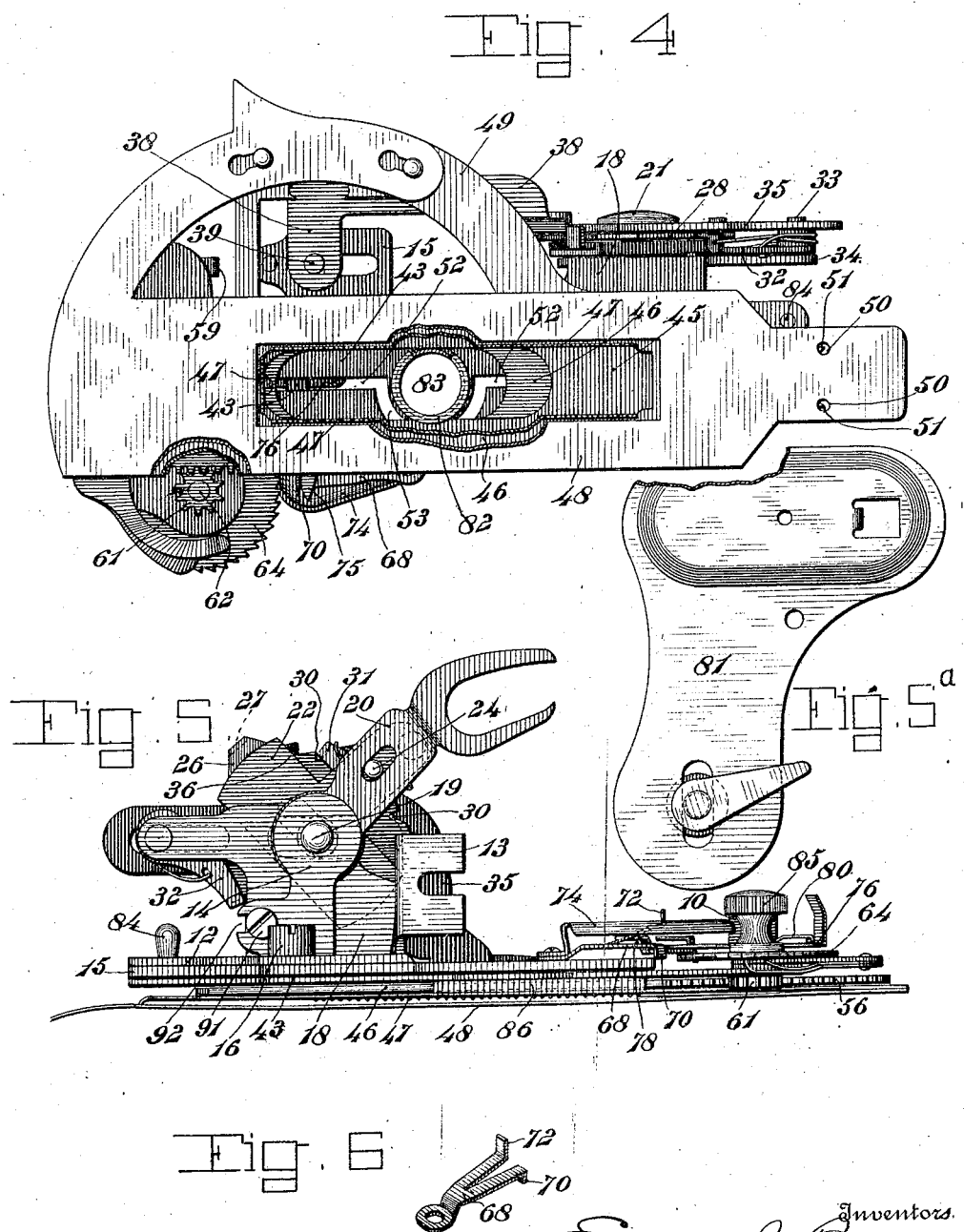

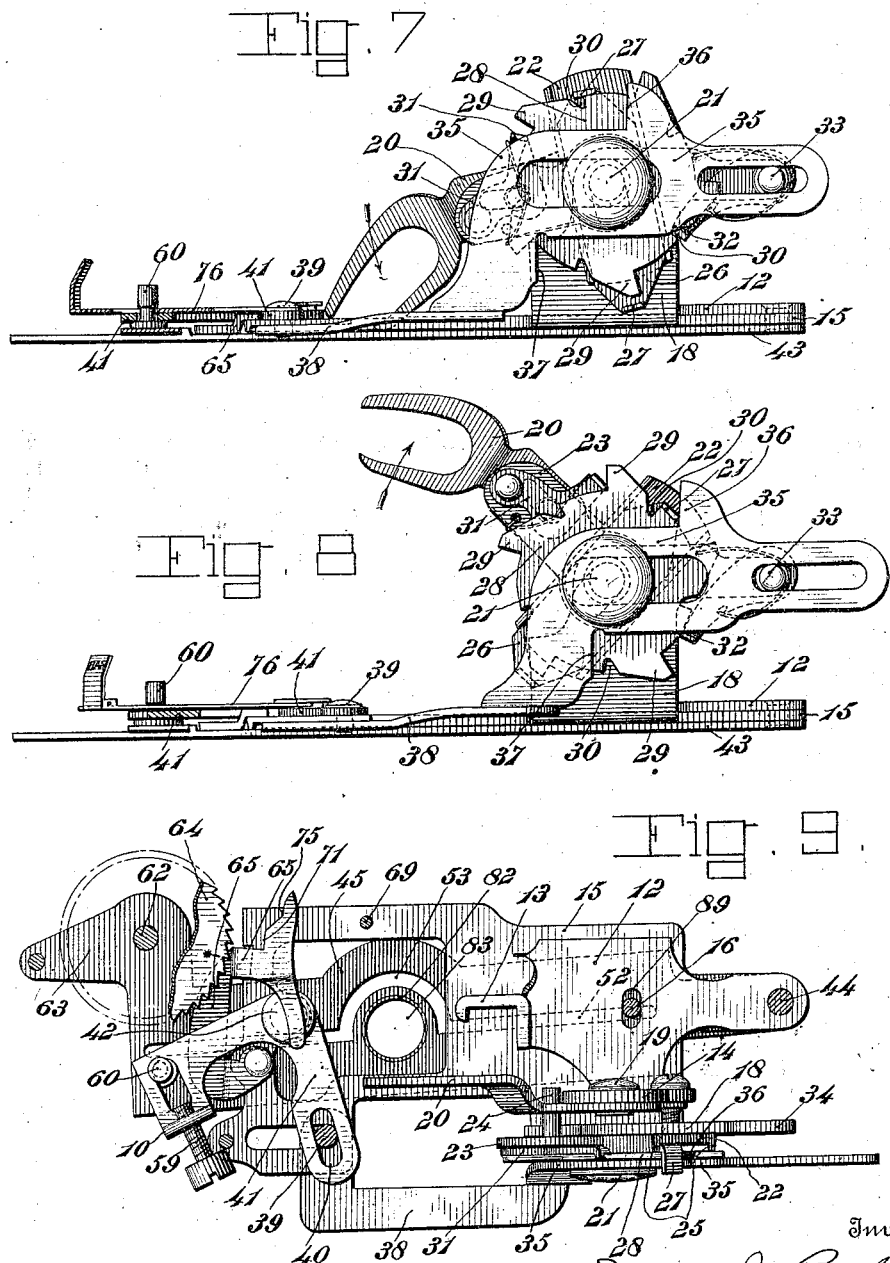

E. J. BOYLER & P. R. & H. M. GREIST.
BUTTONHOLE ATTACHMENT FOR SEWING MACHINES.
APPLICATION FILED AUG. 21, 1911.
1,035,942.
Patented Aug. 20, 1912
6 SHEETS—SHEET 4.
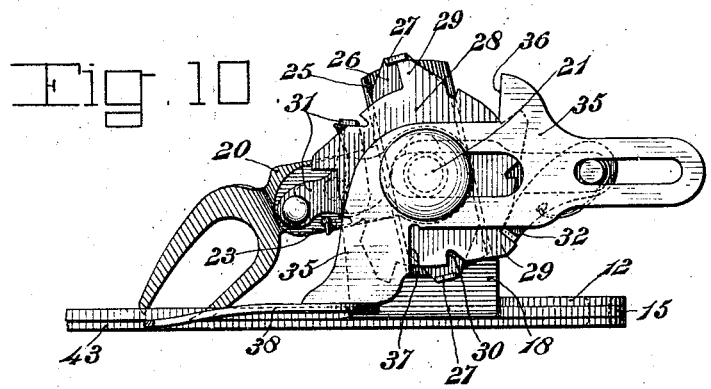
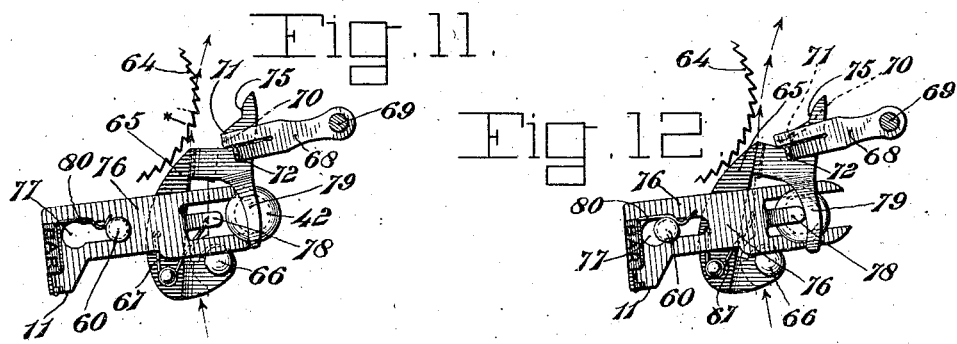
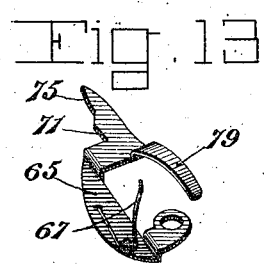
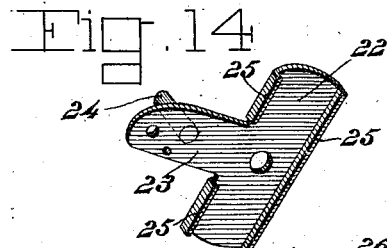
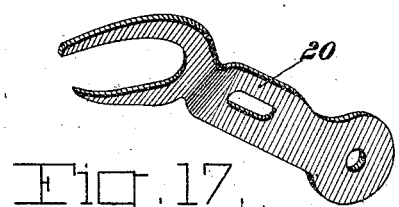
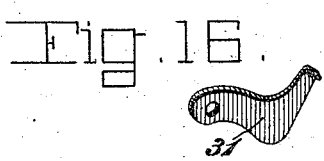
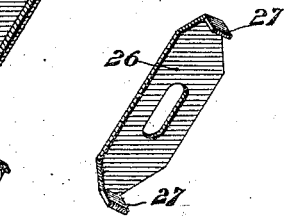

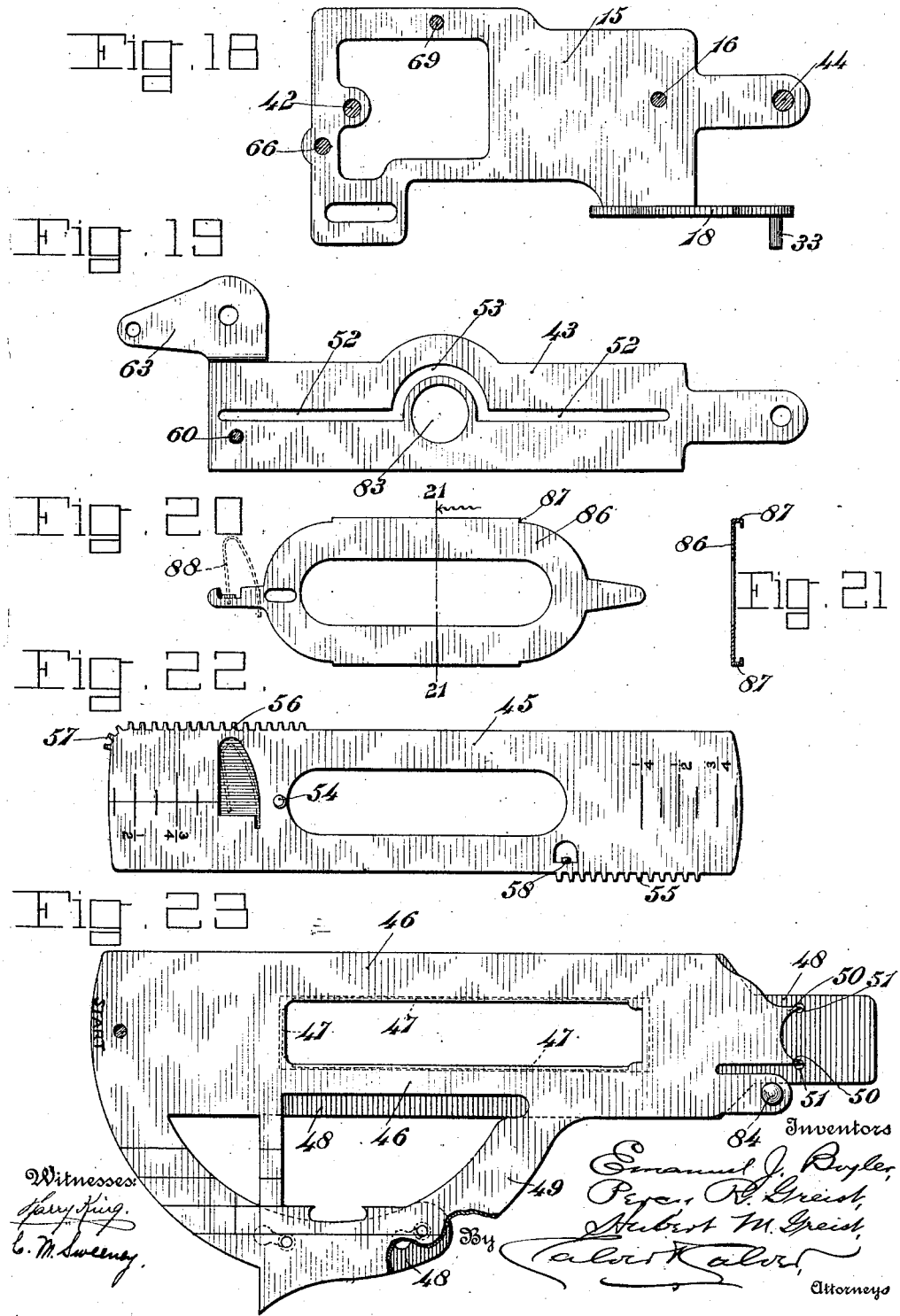

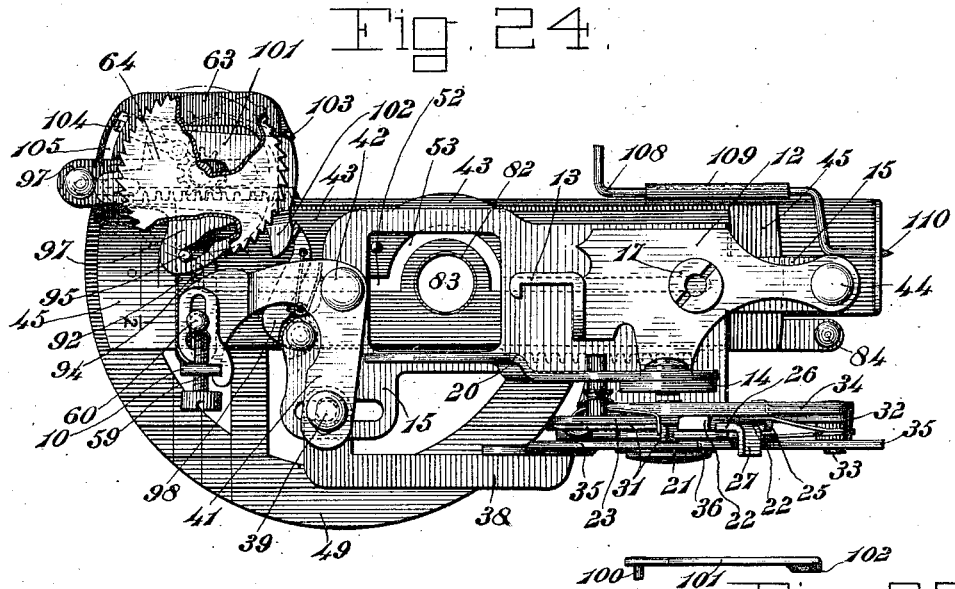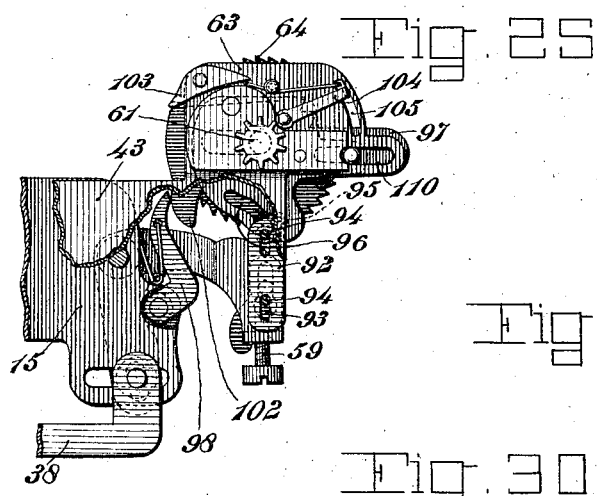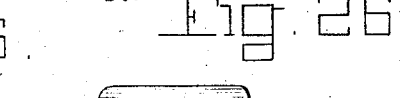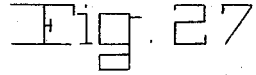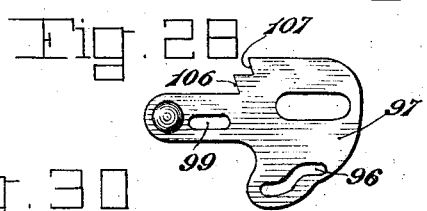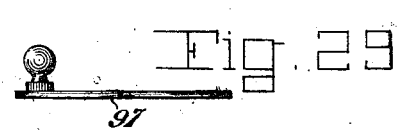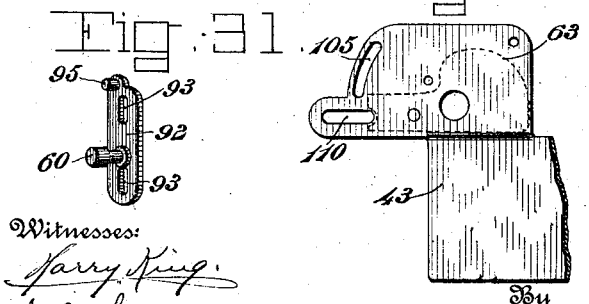

UNITED STATES PATENT OFFICE.

EMANUEL JOHN BOYLER, PERCY R. GREIST, AND HUBERT M. GREIST, OF NEW HAVEN, CONNECTICUT.

BUTTONHOLE ATTACHMENT FOR SEWING-MACHINES.

1,035,942.

Specification of Letters Patent. Patented Aug. 20, 1912.

Application filed August 21, 1911. Serial No. 645,111.

*To all whom it may concern:*

Be it known that we, EMANUEL J. BOYLER, a citizen of Canada, and PERCY R. GREIST and HUBERT M. GREIST, both citizens of the United States, and all residing at New Haven, in the county of New Haven and State of Connecticut, have invented or discovered certain new and useful Improvements in Buttonhole Attachments for Sewing-Machines, of which the following is a specification, reference being had therein to the accompanying drawings.

This invention relates to a buttonhole attachment adapted for use with ordinary family sewing machines, and the invention has for its object to provide an attachment which is simple in construction, and reliable in operation, and which is of such a character that its efficient use can be readily acquired by any person of fair intelligence familiar with the operation of ordinary family sewing machines.

In the operation of the present improved device, in stitching a button-hole, the work is reciprocated laterally beneath the needle of the machine, for the formation of the button-hole stitches, and is also fed lengthwise of the button-hole, these movements being effected automatically by mechanism operated from the needle-bar of the machine; but when the stitching of one side of a button-hole has been completed the workholder is first turned slightly, by automatic or mechanical action, and the semi-rotation or turning movement of said work-holder is then completed manually by the operative, to stitch around one end of the buttonhole, after which the feed of the work, for stitching the other side of the button-hole, is effected automatically or mechanically.

The improved attachment is adapted to be secured to the presser bar of the sewing machine, and the stress of the presser bar spring will therefore be utilized to clamp or hold the work in place, while leaving it free to be moved on the work-plate of the machine.

In the accompanying drawings Figure 1 is a plan view of the improved attachment. Fig. 2 is a side view thereof. Fig. 3 is a detail view of the cover plate and stitch-regulating device to be referred to. Fig. 3ª is a detail transverse section on line 3ª—3ª, Fig. 1. Fig. 4 is a bottom view of the attachment. Fig. 5 is an opposite side view from that shown in Fig. 2. Fig. 5ª is a detail view of the cover plate to be secured to the work-plate of a sewing machine. Fig. 6 is a detail view of the stitch regulator. Figs. 7 and 8 are side views of the attachment with the parts in different positions and with certain parts omitted. Fig. 9 is a plan view with certain parts omitted. Fig. 10 is a partial side view showing some of the parts illustrated in Figs. 7 and 8 but in different positions. Figs. 11 and 12 are detail views of the stitch-regulating mechanism. Figs. 13 to 23, inclusive, are detail views of certain parts to be hereinafter referred to. Fig. 24 is a plan view showing a slightly modified form of the invention. Fig. 25 is a detail view of some of the mechanism of the modified form of the invention shown in Fig. 24, and Figs. 26 to 31, inclusive, are detail views of some of the parts of the modified form of the invention shown in Fig. 24.

Referring to the drawings, 12 denotes a bracket adapted for attachment to the presser bar of a family sewing machine by means of the portion 13 thereof by which the said bracket may be secured to the presser bar by any well known clamping device or a set screw. The bracket 12 is provided with a standard 14, and the said bracket is rigidly attached to a base plate 15 by means of a stud 16 fixed to the said base plate and passing through an opening in the horizontal portion of the bracket 12; said stud being furnished with a clamping nut 17 by which the parts may be rigidly secured together. These parts 12 and 15 constitute the stationary frame-work of the attachment, and they may be permanently riveted together, if desired. These parts 12 and 15 will, however, preferably be adjustably connected for the purpose of regulating the distance apart of the two rows of stitches on the opposite sides of the button-holes, by means which will be hereinafter described.

Pivotally mounted on the standard 14, projecting upward from the horizontal portion of the bracket 12, by means of a stud or rivet 19, is an operating lever 20 forked to embrace a pin or roller-stud on the needle-bar of a sewing machine and from which the attachment is intended to be operated. Pivotally mounted on the standard 18 extending upward from the base plate 15, by means of a stud or rivet 21, is a lever 22 having an arm 23 connected with the operating lever 20 by means of a pin 24 so that as the said operating lever is vibrated on its fulcrum or pivot 19 the said lever 22 will be likewise vibrated. The body portion of the lever 22 is provided with flanges 25 which afford a slideway in which is mounted a sliding escapement plate 26 having horizontally projecting lugs 27. Mounted for rotation on the stud or rivet 21 is a cam and ratchet wheel 28 having an odd number of cam arms 29 (five in the present instance) between which are teeth or notches 30, these teeth or notches being adapted to be alternately engaged by an operating spring-pressed pawl 31 carried by the arm 23 of the lever 22 and by a spring-pressed detent pawl 32 which serves to prevent backward rotation of the cam and ratchet wheel, the said spring-pressed pawls also alternately engaging the faces of the cam arms 29 for driving and detent action. The cam arms 29 are embraced by the horizontal lugs or projections 27 on the escapement plate 26, so that the inclined forward faces of the said cam arms will cause the said escapement plate to be raised or lowered at each vibration of the operating lever 20.

Mounted for reciprocation on the stud or rivet 21 and a second stud or rivet 33 supported by a rearward extension 34 of the standard 18, is an operating slide 35 having openings to receive the said studs or rivets and provided with upper and lower shoulders 36 and 37 to be alternately engaged by the horizontally extending lugs 27 on the sliding escapement plate 26, for the purpose of reciprocating the said operating slide 35. The operating slide 35 is provided with a horizontal, forwardly extending arm 38 provided with a stud 39 which is received in a slot 40 of a bell-crank lever 41 pivoted on a stud 42 on the stationary base plate 15.

The work moving device by which the work may be vibrated laterally relative to the work-plate of the sewing machine, for forming the overedge and depth stitches of a button-hole seam, and by which the work may be fed longitudinally of the button-hole, comprises a vibrating plate 43 pivotally connected at its rear end with the base-plate 15 by a stud or rivet 44, a rack-plate 45 longitudinally movable relative to the said vibrating plate 43, and a feeding plate 46 riveted or otherwise permanently attached to the said rack-plate and provided with downwardly extending teeth or serrations 47 to engage the work. In working button-holes on very thin material a thin spring-metal clamping plate 48, between which and the feeding plate 46 the work will be held, is preferably employed; the said clamping plate 48 being preferably removably secured to an arm or portion 49 of the said feeding plate, as by means of rivets and button-hole slots, as shown in detail in Fig. 23. The feeding-plate 46 is preferably provided at one end with teeth 50 which will register with holes 51 formed on a portion of the clamping plate 48.

The vibrating plate 43 is provided with a longitudinal slot comprising two straight portions 52 connected by a semi-circular portion 53, and the rack-plate 45 is provided with a stud 54 to enter the said slot in the said vibrating plate so as to permit the said rack-plate and the parts carried thereby to be moved longitudinally relative to the said vibrating plate and to be rotated through an arc of 180° thereon. The rack-plate is provided at its opposite edges and at or near its opposite ends with toothed or rack portions 55 and 56, the rack portion 56 being extended around one corner of the said rack-plate by a curved or segmental series of teeth 57, for a purpose which will presently be explained. The rack-plate 45 is guided longitudinally of the vibrating plate 53 by means of the stud 54 working in the slot in the vibrating plate, and also by means of an upwardly extending lug or projection 58 on the rack-plate, and which engages with straight edge portions of the said vibrating plate 43.

The vibrating or lateral movements of the plate 43 are imparted thereto from the bell-crank lever 41 through the screw 59 carried by said bell-crank lever and an impact stud 60 fixed to the said vibrating plate, the vibrating movements of said plate being regulated by a suitable adjustment of said screw so as to provide for more or less lost motion between the inner end of said screw and the said impact stud. This adjustment is for the purpose of varying the "bite" or extent of the depth stitches of a button-hole seam with reference to the overedge stitches thereof; or, in other words, for varying the width of the button-hole seam.

The rack plate is fed longitudinally of the vibrating plate by a pinion 61 which, as herein shown, is mounted on a stud 62 journaled in an arm or portion 63 of the vibrating plate 43, and to the said stud is also secured a ratchet wheel 64 engaged by an operating pawl-plate 65 pivoted on a stud 66 fixed to the base-plate 15. From this construction it results that as the ratchet wheel 64, which is mounted on the vibrating plate 43, is moved back and forth with said plate, the teeth thereof will be engaged by the relatively stationary pawl-plate 65 for the purpose of intermittently rotating said ratchet wheel and the pinion 61 moving therewith; the engagement of said pinion with a toothed portion of the rack-plate causing the said rack-plate and parts carried thereby to be fed longitudinally of the button-hole for the purpose of properly spacing the button-hole stitches.

To provide for making button-holes of different lengths, or of any desired length, the rack-plate is provided with a suitable gage or gage marks, as shown, to be brought into register with any suitable stationary part or index to indicate the starting position of the rack-plate. That is to say by so adjusting the rack-plate at starting that the middle portion of the said rack or toothed part 56 will be in mesh with the pinion 61 a button-hole of about half the length of said rack or toothed part will be provided for; and by so adjusting said rack-plate at starting that said pinion will occupy a position farther from or nearer to the segmental toothed part 57 longer or shorter button-holes may be worked.

The button-hole stitches may be made finer or coarser, or may be spaced more or less closely, by varying the feeding movements of the ratchet-wheel, these movements being regulated by adjusting the pawl-plate 65 to different positions so that in its swinging movements the ratchet wheel will be caused to be rotated to the extent of one or more teeth at each vibratory movement of the vibrating plate 43, as may be desired. The pawl plate 65 is forced toward the ratchet wheel by a spring 67, and the working position of the said pawl plate may be varied by means of a stitch-regulator 68 pivotally attached by a stud or rivet 69 to the base-plate 15, so that the said regulating plate may be adjusted to different positions. The said stitch-regulator is forked to provide two arms one of which is bent downward at its outer end to form a lug 70 adapted to engage a shoulder or part 71 on the pawl-plate 65, and the other of which is bent upward to form a lug 72 extending through a slot 73 in a cover-plate 74 (see Figs. 5, 6, 11, 12 and 13). When the stitch regulator is moved to the position shown in Fig. 11 the pawl-plate 65 will be so controlled in its movements as to impart a rotation to the ratchet wheel 64 to the extent of one tooth of said ratchet wheel at each vibratory movement of the plate 43, the lug 70 of said stitch regulator, with said adjustment, engaging the shoulder 71 on the pawl-plate 65. When, however, the said stitch regulator is moved to the position indicated in Fig. 3 the lug 70 on the said regulator will engage the shoulder 75 on the said pawl-plate 65; and with the parts thus adjusted the ratchet wheel 64 will be rotated to the extent of two teeth at each vibratory movement of the plate 43; thereby spacing the stitches less closely than with the slower feed of the ratchet-wheel, as will be understood.

When the stitching of the button-hole has been completed and it is desired to stay or finish the end of the button-hole by a few barring stitches which will be piled on top of each other, the feeding movements effected by the ratchet wheel may be suspended by throwing the pawl-plate 65 into such position that it will be entirely out of engagement with the said ratchet wheel, as the latter swings back and forth with the plate 43. This result is effected by the barring plate 76 which is provided with a slot therein receiving the impact stud 60, and which barring plate has a forked inner end embracing the stud 42, so that the said barring plate may be slid back and forth. Said barring plate is provided with a tongue 78 adapted to engage an arm or portion 79 of the pawl-plate 65, and the said barring plate may be retained either in an operative or inoperative position by a detent spring 80 attached thereto and having a bent portion at its free end adapted to engage the stud 60, as will be understood by reference to Figs. 11 and 12. When the barring plate is in its inoperative position shown in Fig. 11 the proper action of the vibrating pawl plate 65 will not be interfered with; but when the said barring plate is forced inward to the position shown in Fig. 12 the tongue 78 thereon will engage the arm 79 on the said pawl plate and will move it to such a position that the ratchet-wheel 64, in its vibrating movements, will swing clear of the teeth of the said pawl-plate 65. When the barring slide 76 is forced inward to the barring position shown in Fig. 12 a shoulder 11 on said slide comes opposite the lug 10 through which the regulating screw 59 passes, so as to take up all lost motion between the lever 41 and the vibrating plate 43, thus imparting an increased swinging movement to said plate so as to make long barring stitches extending across the ends of both rows of button-hole stitches, as is desirable in barring buttonholes in some kinds of goods, more particularly thick goods.

In the operation of the invention the attachment will be secured to the presser-bar of the sewing machine by means of the attaching portion 13, and the feeding device of the sewing machine will be shut out of action by means of a cover plate 81 which will be secured to the work-plate of the sewing machine in proper position to cover the feed dog, to effect this result. The work will then be inserted between the feeding plate 46 and the clamping plate 48, if such clamping plate be employed, or between the said feeding plate and the work-plate of the machine, if the clamping plate is not needed owing to the kind of material in which the button-holes are to be made. With the attachment thus secured to the sewing machine a screw or stud on the needle-bar will be engaged by the forked portion of the operating lever 20, so as to impart vibratory movement to said lever and to the lever 22 connected therewith. With the parts thus mounted an intermittingly rotating movement will be imparted to the cam and ratchet wheel 28 by the engagement of the feeding pawl 31 with the parts of the said cam and ratchet wheel as hereinbefore indicated. As the said cam and ratchet wheel is intermittingly rotated the cam arms 29 thereof will alternately lift and depress the sliding escapement plate 26 by virtue of the alternate engagement of the said cam arms with the lugs 27 on the said escapement plate. The lugs 27 are so arranged as to alternately engage the shoulders 36 and 37 on the sliding plate 35, so that as the said escapement plate is vibrated with the lever 22 it will move the sliding plate 35 back and forth, as will be understood by reference to Figs. 2, 7, 8 and 10 in which these operating parts are shown in different positions. From this it results that through the connections herein described of the said sliding plate with the vibrating plate 43 and the ratchet-wheel 64 the said wheel 64 will be intermittingly rotated for the purpose of forming the overedge or button-hole stitches and also for the purpose of feeding the work along beneath the needle.

When the attachment is in proper adjustment for starting position the pinion 61 will be in engagement with the inner portion of the rack or toothed portion 56 of the rack-plate 45, and the said rack-plate will be fed longitudinally, with the stud 54 moving in a straight portion 52 of the slot in the vibrating plate 43 until the said stud arrives at the semi-circular portion of said slot, and at this time the pinion 61 will be in engagement with the segmental series of teeth 57 at a corner portion of said rack-plate and will thus automatically commence a turning movement of the said rack-plate and the said feed plate connected therewith, by virtue of the pivotal connections of these plates with the vibrating plate 43 afforded by the sleeve 82 fitting tightly in an opening 83 in the said vibrating plate 43, and through which opening the needle bar descends in working the button-hole; the said sleeve thus affording a pivotal connection between the said rack plate and vibrating plate. At this point the operator, observing the commencement of the turning movement of the rack-plate, takes hold of the pin 84 and slowly turns the connected feeding and rack plates through an arc of 180°, including the initial turning movement automatically imparted to these feeding parts by the engagement of the pinion 61 with the curved or segmental rack portion 57. As this turning movement will be effected while the machine is running a semi-circular series of radiating stitches will be formed at the end of the button-hole, and when the rack-plate is thus reversed the rack portion 55 thereof will be brought into engagement with the said pinion, so that a reverse feeding movement will automatically occur for the purpose of stitching the second side of the button-hole. When the stitching of the second side of the button-hole has thus been completed, and it is desired to finish the end of the button-hole by a few barring stitches, the barring slide 76 is forced inward to throw the pawl-plate 65 out of action, and thereby suspend the longitudinal feed of the work.

When the barring stitches have been completed the work will be removed, and with the pawl plate 65 out of engagement with the ratchet-wheel the latter may now be turned backward by means of the milled head 85 on the shaft or stud of the ratchet wheel, for the purpose of returning the connected feeding and rack plates to their first or starting position. In order that the toothed portion 55 of the rack-plate 45 may be in engagement with the pinion 61, when this reverse manual operation is to commence, a spring-pressed plate 86 having a central longitudinal opening similar to the central longitudinal opening in the rack-plate is slidably mounted on the rack plate by virtue of the flanges 87 at the edges of said plate 86 and which flanges embrace the opposite edges of the said rack-plate. The spring-pressed plate 86 is so located with reference to the rack-plate that, as the latter is fed along, the wall at one end of the central slot or opening in the said spring-pressed plate 86 will come into contact with the central pivot afforded by the hub or sleeve 82 on the vibrating plate 43 before the end of the rack 55 passes the pinion 61. The said hub or sleeve 82, which serves as a pivot for the rack-plate 45, is received in the central longitudinal slot or opening in the said rack-plate. When the wall at one end of the slot in the spring-pressed plate 86 comes into contact with the hub or sleeve 82 the said plate 86 will yield slightly in opposition to its coöperating spring 88 to permit the rack-plate to be fed to the end of the said toothed portion 55. When, however, the rack plate and the parts connected therewith are reversed for a new starting operation, the spring 88 will act on the rack-plate so as to force the end tooth or teeth of the rack portion 55 into engagement with the pinion 61 in readiness to commence the immediate manual return of the parts to their starting position by turning the said ratchet wheel backward and swinging the pivoted rack plate and connected parts around on their central pivot, and then, by continued reverse rotation of the ratchet wheel, bring the parts to their first or starting position. After the connected rack and feeding plates have been reversely swung on their pivotal connection with the vibrating plate 43, in returning the parts to starting position, the segmental section 57 of the teeth of the rack-bar will be brought into engagement with the teeth of the pinion, and in this position of the parts the spring-pressed plate 86 will also serve to hold the teeth of the rack-plate in engaging contact with the pinion as the pinion engages the segmental rack portion 57 at the corner portion of the rack plate at the times when these teeth pass by the said pinion. This action is permitted by the manner in which the spring 88 is disposed so that it is double-acting and can press the plate 86 yieldingly in either direction.

While, as hereinbefore stated, the parts 12 and 15, constituting the stationary framework of the attachment may be permanently attached together by riveting or otherwise, it is preferred to connect these parts adjustably for the purpose of regulating the distance between the two rows of stitches on the opposite side of a buttonhole, as hereinbefore suggested. This adjustable connection of these parts is, in the present instance, afforded by the somewhat enlarged hole or slot 89 in the bracket part 12, and through which the stud 16, fixed to the base plate 15, loosely passes. When the clamping nut 17, by which these parts may be rigidly secured together, is loosened, the base plate 15 may be adjusted slightly laterally relative to the bracket 12 by an adjusting screw 91 passing through a slot 92 in the standard 14, and having, inside of said standard, a collar which affords a swiveled connection between the said screw and standard, the threaded portion of the screw being tapped in the standard 18 projecting upward from the base plate 15. This construction provides a delicate screw adjustment of the base plate 15 relative to the bracket 12; and when the parts have been located in any desired position of adjustment the said bracket and base-plate may be rigidly secured together by means of the clamping nut 17.

In the form of the invention illustrated by Figs. 24 to 31, inclusive, the main working parts of the attachment are, or may be, essentially the same as in the form of the invention hereinbefore described, although this modified form of the invention embodies certain constructions which are, for some reasons, deemed preferable to those hereinbefore referred to. The impact pin 60, through which the movements of the bell-crank lever 41 are imparted to the vibrating plate 43, instead of being fixedly secured to the said vibrating plate, as in the construction hereinbefore described, is carried by a slide 92 which is provided with slots 93 receiving pins 94 on the said vibrating plate, said slide being movably mounted on said plate 43. The slide 92 is provided with a pin 95 which engages a cam slot 96 in a barring slide 97 through which the spring-pressed pawl 98, pivotally mounted on the base plate 15 and serving to rotate the ratchet wheel 64, may be thrown out of action. The barring slide 97 is mounted on the part 63 of the vibrating plate 43. In moving the said barring slide inward, to the position shown in Figs. 24 and 25, the cam slot 96 will cause the working position of the impact pin 60 to be changed so that in the barring operation the barring stitches will be brought opposite the middle of the end of the button-hole. The barring slide 97 is provided with a slot 99 which receives a pin 100 on a shipper-plate 101 having a finger 102 which is arranged to engage the pawl 98 and carry the same out of range of movement of the ratchet-wheel 64, so as to suspend the rotation of said ratchet-wheel when barring is to be done. The slot 99 affords a certain amount of lost motion between the barring slide 97 and the shipper plate 101, so that the said barring slide may have a sufficiently long movement to afford an easy cam construction of the slot 96 without moving the shipper plate too far. The pin 100 extends into a guiding slot 110 in the part 63 of the plate 43. The shipper plate 101, in removing the operating pawl 98 from the range of movement of the ratchet-wheel, also disengages the detent pawl 103, by which the backward movement of the said ratchet wheel is prevented, from the said ratchet-wheel when the barring slide is moved inward. In this modified form of the invention a regulation of the feed of the ratchet-wheel is provided for by a regulating finger 104 pivoted to the lower side of the part 63 of the vibrating plate 43 which carries the ratchet-wheel and pinion and which regulating finger has an end portion projecting upwardly through a slot 105 in the said plate and within range of shoulders 106, 107 on the barring slide 97. When the said finger is adjusted so as to be opposite the shoulder 106, the shipper plate 101 will be only partly withdrawn, so that the operating pawl 98 will engage the ratchet-wheel in such a manner as to impart a feeding movement of one tooth at each swinging movement of the vibrating plate; but when the said regulating finger is so adjusted as to be opposite the shoulder 107 the shipper-plate 101 will be withdrawn far enough to permit the operating pawl to feed the ratchet-wheel forward to the extent of two teeth for each swinging movement of the vibrating plate 43.

In the operation of the attachment on heavy goods, and when the lower clamping plate coöperating with the feed plate is dispensed with, it is sometimes desirable to pin the goods to the attachment so that the goods will be positively moved when a semi-rotation is imparted to the rack plate and feed plate in stitching around one end of a button-hole. To this end this modified form of the attachment is shown as being provided with a sliding pin 108 mounted in a sleeve 109 on the feed plate, and having a pointed end 110 extending beyond the rear end of the said feed-plate so that it may be engaged with the goods.

From the foregoing it will be understood that the button-hole attachment herein shown and described operates on the same general principle of the somewhat similar attachment shown and described in our application No. 580,401, filed Sept. 3, 1910; the present invention relating to certain improvements on the attachment of our said application. We do not therefore herein claim broadly certain features which are common to the attachment of the present case and to the attachment of our application referred to, the claims of the present case being limited to certain improvements on the attachment of our said application.

Having thus described our invention we claim and desire to secure by Letters Patent:

1. In a buttonhole attachment for sewing machines, the combination with a work-holding and feeding device comprising a laterally vibrating plate and a rack plate guided longitudinally on said vibrating plate and having toothed portions, of a pinion mounted on said vibrating plate and adapted to mesh with the said toothed portions of said rack plate, a ratchet wheel also mounted on said vibrating plate, a relatively stationary pawl arranged to be engaged by said ratchet-wheel as the latter moves with said vibrating plate, to rotate said pinion, and a manually operated device or slide whereby said pawl may be thrown out of operative relation to said ratchet wheel for the purpose of suspending the feeding movements of said work-holding and feeding device when a button hole is to be barred.

2. In a button-hole attachment for sewing machines, the combination with a work-holding and feeding device, of mechanism for vibrating the same laterally for the purpose of forming button-hole stitches in the work, means, comprising a pawl and ratchet-wheel, for feeding a portion of said work-holding and feeding device longitudinally, to space the stitches, and a manually operated device or slide whereby said pawl may be thrown out of operative relation to said ratchet-wheel when a button-hole is to be barred, said manually operated device or slide comprising means coöperating with the vibrating mechanism whereby the lateral vibrations of said work-holding and feeding device will be increased in extent when said pawl is rendered inoperative.

3. In a button-hole attachment for sewing machines, the combination with a work holding and feeding device comprising a vibrating plate and a rack-plate longitudinally movable relative to said vibrating plate and provided with toothed or rack portions on its opposite outer edges and near its opposite ends, of mechanism for vibrating the said holding and feeding device laterally for the purpose of forming button-hole or overseaming stitches in the work, means, comprising a pawl and ratchet-wheel, for feeding a portion of said work-holding and feeding device longitudinally, to space the stitches, and a manually operated device or slide whereby said pawl may be thrown out of operative relation to said ratchet-wheel when a button-hole is to be barred.

4. In a button-hole attachment for sewing machines, the combination with a work holding and feeding device comprising a vibrating plate and a rack-plate longitudinally movable relative to said vibrating plate and provided with toothed or rack portions on its opposite outer edges and near its opposite ends, of mechanism for vibrating the said holding and feeding device laterally for the purpose of forming button-hole stitches in the work, means, comprising a pawl and ratchet-wheel, for feeding a portion of said work-holding and feeding device longitudinally, to space the stitches, and a manually operated device or slide whereby said pawl may be thrown out of operative relation to said ratchet-wheel when a button-hole is to be barred, said manually operated device or slide comprising means coöperating with the vibrating mechanism whereby the lateral vibrations of said work-holding and feeding device will be increased in extent when said pawl is rendered inoperative.

5. In a button-hole attachment for sewing machines, the combination with a work holding and feeding device comprising a vibrating plate and a rack-plate longitudinally movable relative to said vibrating plate and provided with toothed or rack portions on its opposite outer edges and near its opposite ends, said vibrating plate being provided with a longitudinal slot having two straight portions and an intermediate curved portion, and said rack-plate being pivotally mounted on said vibrating plate and having a guiding pin working in said slot, of mechanism for vibrating the said holding and feeding device laterally for the purpose of forming button-hole or overseaming stitches in the work, means, comprising a pawl and ratchet-wheel for feeding a portion of said work-holding and feeding device longitudinally to space the stitches, and a manually operated device or slide whereby said pawl may be thrown out of operative relation to said ratchet-wheel when a button-hole is to be barred.

6. In a button-hole attachment for sewing machines, the combination with a work-holding and feeding device comprising a vibrating plate and a rack-plate longitudinally movable relative to said vibrating plate and provided with toothed or rack portions on its opposite outer edges and near its opposite ends, said vibrating plate being provided with a longitudinal slot having two straight portions and an intermediate curved portion; and said rack-plate being pivotally mounted on said vibrating plate and having a guiding pin working in said slot, of mechanism for vibrating the said holding and feeding device laterally for the purpose of forming button-hole stitches in the work, means, comprising a pawl and ratchet-wheel, for feeding a portion of said work-holding and feeding device longitudinally, to space the stitches, and a manually operated device or slide whereby said pawl may be thrown out of operative relation to said ratchet-wheel when a button-hole is to be barred, said manually operated device or slide comprising means coöperating with the vibrating mechanism whereby the lateral vibrations of said work-holding and feeding device will be increased in extent when said pawl is rendered inoperative.

7. In a button-hole attachment for sewing machines, the combination with a work-holding and feeding device comprising a laterally movable vibrating plate having a central hub or sleeve, of a rack-plate guided longitudinally on said vibrating plate and pivotally mounted on said hub or sleeve, said rack plate having a central longitudinal opening receiving said hub or sleeve and having also toothed or rack portions at its opposite outer edges and near its opposite ends, and a spring-pressed plate slidingly mounted on said rack- plate and having a central longitudinal opening also receiving said hub or sleeve.

8. In a button-hole attachment for sewing machines, the combination with a work-holding and feeding device comprising a laterally movable vibrating plate having a central hub or sleeve, of a rack-plate guided longitudinally on said vibrating plate and pivotally mounted on said hub or sleeve, said rack-plate having a central longitudinal opening receiving said hub or sleeve and having also toothed or rack portions at its opposite outer edges and near its opposite ends, one of said toothed or rack portions being continued into a toothed segmental portion extending around one corner of said rack plate, and a spring-pressed plate slidingly mounted on said rack plate and having a central longitudinal opening also receiving said hub or sleeve.

9. In a button-hole attachment for sewing machines, the combination with a vibrating plate and means for reciprocating the same laterally, of a rack-plate guided longitudinally on said vibrating plate and connected therewith so as to vibrate laterally and having toothed or rack portions at its opposite outer edges and near its opposite ends, a feed plate beneath and connected to and movable with said rack-plate and having downwardly extending teeth or serrations, and a thin spring-metal clamping plate beneath and connected to said feed plate.

10. In a button-hole attachment for sewing machines, the combination with a vibrating plate and means for reciprocating the same laterally, of a rack-plate guided longitudinally on said vibrating plate and connected therewith so as to vibrate laterally and having toothed or rack portions at its opposite outer edges and near its opposite ends, one of said toothed or rack portions being continued into a toothed segmental portion extending around one corner of said rack-plate, a feed plate beneath and connected to and movable with said rack-plate and having downwardly extending teeth or serrations, and a thin spring-metal clamping plate beneath and connected to said feed plate.

In testimony whereof we affix our signatures in presence of two witnesses.

EMANUEL JOHN BOYLER.
PERCY R. GREIST.
HUBERT M. GREIST.

Witnesses:
W. GREIST,
HERBERT B. DARTON.